April 1, 1969  W. H. VAN DONSELAAR  3,436,581
LAMINATED FLAT DISC-SHAPED ROTORS
Filed Aug. 25, 1966

INVENTOR.
WILHELMUS H. VAN DONSELAAR
BY
AGENT

United States Patent Office 3,436,581
Patented Apr. 1, 1969

3,436,581
LAMINATED FLAT DISC-SHAPED ROTORS
Wilhelmus Hendrikus van Donselaar, Emmasingel, Eindhoven, Netherlands, assignor to North American Philips Company, Inc., New York, N.Y., a corporation of Delaware
Filed Aug. 25, 1966, Ser. No. 574,965
Claims priority, application Netherlands, Sept. 23, 1965, 6512350
Int. Cl. H02k 1/22
U.S. Cl. 310—268    3 Claims The invention relates to a laminated flat disc-shaped rotor for use in an electric machine. Such rotors are used when it is desirable or required that the axial dimensions of the motor are held to a minimum, for example, in certain domestic apparatus and the like.

The invention provides such a motor which is particularly suitable for manufacture by mass production techniques. According to the invention, a rotor of the aforementioned kind is characterized in that the laminations of the rotor are built up of segments of ferromagnetic material which are rigidified by being pressed against a circular plate of nonmagnetizable material. The rotor segments are secured at one end (the rotor axis end) in a hub, while they are enclosed at their periphery by one or more rings of nonmagnetic material. Each segment is provided on each side with recesses, so that one recess of one segment together with the recesses of the adjacent segment define a coil chamber. These coil chambers are open to freely receive induction coil rings which are subsequently held in their respective chambers by tags, forming part of one or more rings lying outside these chambers. These tags are press fitted into grooves provided in the wall of the coil chambers whereby the coils are enclosed satisfactorily and, moreover, the segments are fixed without the use of screws, rivet or flange joints.

The invention will now be described with reference to the drawing, which shows a preferred embodiment of the invention and in which.

Figures 1, 2:
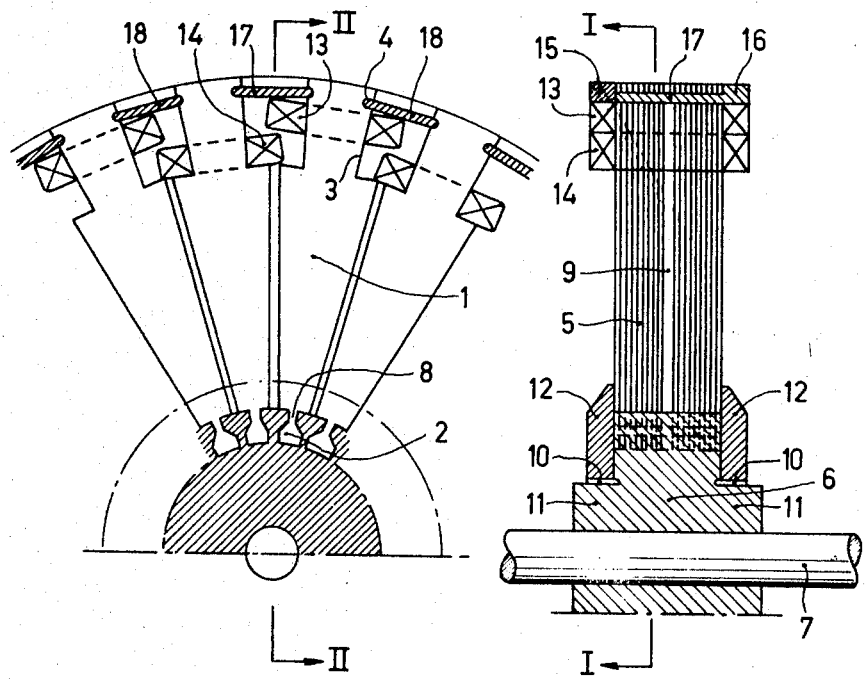
FIG. 1 is a partial sectional view of a laminated segment rotor taken on the line I—I of FIG. 2.
FIG. 2 is a cross sectional view of the rotor of FIG. 1 taken on the line II—II.

In FIGS. 1 and 2, reference numeral 1 designates a lamination segment which at its lower end has a tag 2 and which is provided on both sides with notches 3 at its upper end. Above notches 3 each segment has grooves 4 on both sides. These segments together constitute a rotor body 5 which has a hub 6 with a shaft 7 secured therein. Each segment contains a stack of eighteen laminations or plates as seen in FIG. 2.

The hub 6 is provided with grooves or axial slots having a shape which corresponds with the shape of the tags 2 so that a dovetail connection between the segments 1 and the hub 6 is established. The stack of laminations in each segment is divided into two spaced parts as seen in FIG. 2. Between the two parts a plate 9, of nonmagnetizable material, is provided which serves to reinforce each stack of plates defining a segment and which is connected with the hub in the same manner as each of the segments. The hub 6 is made of non-ferrous metal and has an axial shoulder 11 at each end which is provided with a thread 10 and on which a flange 12 is screwed; the two flanges 12 compress the rotor segments.

The notches 3 of adjacent segments 1 constitute a coil chamber receiving inductor coils 13 and 14.

Figure 3:
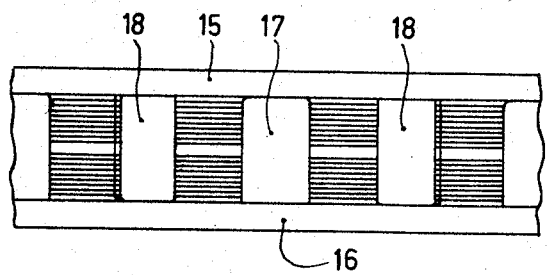
FIG. 3 shows a part of two rings with tags enclosing the rotor.

A pair of rings 15 and 16 are arranged one on each side of the rotor at the periphery thereof. These rings have tags 17 and 18 which are press fitted into the grooves 4 of segments 1. Each ring has a number of tags spaced from one another so that the tags of one ring enter every other notch 3, thus the tags 17 of one ring lie between two tags 18 of the other ring as seen in FIGS. 1 and 3. After the assembly has been completed, a flat laminated rotor having satisfactory electrical and mechanical properties is obtained and which can be assembled in a very simple manner and is therefore suitable for mass production.

What I claim is:

1. A laminated flat disc-shaped rotor for use in an electric machine, comprising a plurality of laminated rotor segments of ferromagnetic material, the laminations of each segment being located on each side of a circular plate of nonmagnetizable material, said circular plate and each lamination of said plurality of segments being secured at one end in a rotor hub, the other end of said laminations being enclosed at their periphery by one or more rings of nonmagnetizable material.

2. A rotor as claimed in claim 1, characterized in that said laminations of said segments are secured in said hub by means of a dovetail connection.

3. A rotor as claimed in claim 2, wherein each said segment is provided on each of its radial sides with a recess, the recesses of adjacent segments defining a coil chamber, a plurality of induction coils received in said coil chambers, a pair of rings having tags extending at right angles thereto, said tags being press fitted into the walls defining said coil chamber for retaining said coils therein.

References Cited

UNITED STATES PATENTS

| | | | |
|---|---|---|---|
| 1,024,572 | 4/1912 | Hellmund | 310—214 |
| 1,355,347 | 10/1920 | Mortensen | 310—218 |
| 2,734,140 | 2/1956 | Parker | 310—268 |

JOHN F. COUCH, *Primary Examiner.*

D. J. HARNISH, *Assistant Examiner.*